United States Patent
Jiang et al.

(10) Patent No.: US 9,419,719 B2
(45) Date of Patent: Aug. 16, 2016

(54) TRANSMITTER APPARATUS AND METHOD

(71) Applicant: Huawei Technologies Co., Ltd., Shenzhen (CN)

(72) Inventors: Zhiping Jiang, Kanata (CA); Chen Chen, Ottawa (CA); Zhuhong Zhang, Ottawa (CA); Chuandong Li, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 14/219,799

(22) Filed: Mar. 19, 2014

(65) Prior Publication Data
US 2015/0270904 A1     Sep. 24, 2015

(51) Int. Cl.
*H04J 14/02*     (2006.01)
*H04B 10/532*    (2013.01)
*H04B 10/556*    (2013.01)
*H04B 10/50*     (2013.01)

(52) U.S. Cl.
CPC .......... *H04B 10/532* (2013.01); *H04B 10/506* (2013.01); *H04B 10/5561* (2013.01); *H04B 10/5563* (2013.01); *H04J 14/02* (2013.01)

(58) Field of Classification Search
CPC .......... H04B 10/505–10/5053; H04B 10/516; H04B 10/5161; H04B 10/548–10/5563; H04J 14/00–14/0252
See application file for complete search history.

(56) References Cited

U.S. PATENT DOCUMENTS

| | | | | |
|---|---|---|---|---|
| 5,537,634 A * | 7/1996 | Fye | ............... | H04J 14/0298 398/76 |
| 5,627,668 A * | 5/1997 | Fye | ............... | H04J 14/0298 398/152 |
| 6,430,148 B1 * | 8/2002 | Ring | ............... | H04L 5/023 370/203 |
| 6,661,974 B1 * | 12/2003 | Akiyama | ........ | H04B 10/2513 398/158 |
| 6,754,285 B1 * | 6/2004 | Kiykioglu | ....... | H04L 25/0286 375/297 |
| 7,164,858 B2 * | 1/2007 | Shiozaki | .......... | H04J 14/02 398/48 |
| 7,965,947 B2 * | 6/2011 | Yu | ................. | H04B 10/2587 398/185 |
| 8,634,724 B2 * | 1/2014 | Buelow | ............ | H04L 5/0046 398/158 |
| 8,699,880 B2 * | 4/2014 | Grigoryan | ....... | H04B 10/548 398/152 |
| 8,768,177 B2 * | 7/2014 | Wu | ................ | H04J 14/026 398/194 |

(Continued)

FOREIGN PATENT DOCUMENTS

CN     101834671 A     9/2010

OTHER PUBLICATIONS

International Search Report of Patent Cooperation Treaty (PCT), International Application No. PCT/CN2015/074297, Applicant Huawei Technologies Co., Ltd., date of mailing Jun. 26, 2015, 13 pages.

*Primary Examiner* — Li Liu
(74) *Attorney, Agent, or Firm* — Slater Matsil, LLP

(57) ABSTRACT

An apparatus comprises a digital signal processing module configured to receive a data stream and generate a plurality of digital multiple tones, a plurality of digital-to-analog converters coupled to the digital signal processing module, a plurality of drivers coupled to respective digital-to-analog converters, an electro-optic modulator having inputs coupled to the drivers and outputs coupled to a fiber and a multi-wavelength light source coupled to the electro-optic modulator.

20 Claims, 2 Drawing Sheets

(56) References Cited

U.S. PATENT DOCUMENTS

| | | | | |
|---|---|---|---|---|
| 9,112,608 B2* | 8/2015 | Bai | ...................... | H04B 10/532 |
| 2002/0012152 A1* | 1/2002 | Agazzi | ................ | H03M 1/0624 |
| | | | | 398/202 |
| 2002/0126349 A1* | 9/2002 | Sarraf | ...................... | H04J 14/02 |
| | | | | 398/82 |
| 2009/0067843 A1* | 3/2009 | Way | ...................... | H04B 10/506 |
| | | | | 398/79 |
| 2009/0232253 A1* | 9/2009 | Letunov | .............. | H04L 27/3405 |
| | | | | 375/298 |
| 2009/0238580 A1* | 9/2009 | Kikuchi | ........... | H04B 10/25137 |
| | | | | 398/192 |
| 2010/0028005 A1* | 2/2010 | Beckett | ................ | H04B 10/505 |
| | | | | 398/79 |
| 2010/0046946 A1* | 2/2010 | Cao | ..................... | H04J 14/0226 |
| | | | | 398/72 |
| 2010/0098000 A1* | 4/2010 | Gerszberg | ........... | H04Q 3/0016 |
| | | | | 370/328 |
| 2010/0111533 A1* | 5/2010 | Beckett | ............... | H04J 14/0282 |
| | | | | 398/68 |
| 2010/0142962 A1 | 6/2010 | Poustie et al. | | |
| 2010/0329683 A1* | 12/2010 | Liu | ..................... | H04B 10/2513 |
| | | | | 398/81 |
| 2011/0170873 A1* | 7/2011 | Liu | ......................... | H04J 14/02 |
| | | | | 398/82 |
| 2011/0236025 A1* | 9/2011 | Wagner | ................. | H03L 7/0807 |
| | | | | 398/115 |
| 2011/0255870 A1* | 10/2011 | Grigoryan | ............ | H04B 10/548 |
| | | | | 398/65 |
| 2011/0305462 A1* | 12/2011 | Buelow | .................. | H04L 5/0046 |
| | | | | 398/158 |
| 2012/0141130 A1* | 6/2012 | Nakashima | .......... | H04B 10/572 |
| | | | | 398/82 |
| 2012/0243876 A1* | 9/2012 | Tang | ..................... | H04B 10/548 |
| | | | | 398/135 |
| 2012/0251120 A1 | 10/2012 | McNicol et al. | | |
| 2013/0058648 A1* | 3/2013 | Ji | ........................ | H04J 14/0221 |
| | | | | 398/38 |
| 2013/0089339 A1* | 4/2013 | Liu | ...................... | H04B 10/112 |
| | | | | 398/152 |
| 2013/0272698 A1* | 10/2013 | Jin | ...................... | H04L 27/2628 |
| | | | | 398/43 |
| 2013/0315267 A1* | 11/2013 | Sasaki | ................ | H04B 10/5563 |
| | | | | 370/536 |
| 2014/0099114 A1* | 4/2014 | Nishihara | ........... | H04J 14/0256 |
| | | | | 398/67 |
| 2014/0241378 A1* | 8/2014 | Vanderhaegen | ...... | H04L 1/0003 |
| | | | | 370/465 |
| 2014/0314411 A1* | 10/2014 | Huang | ................. | H04B 10/506 |
| | | | | 398/65 |
| 2014/0362874 A1* | 12/2014 | Nishimoto | ........... | H04B 10/616 |
| | | | | 370/535 |
| 2014/0369677 A1* | 12/2014 | Tanaka | ................... | H04B 10/50 |
| | | | | 398/25 |
| 2015/0071642 A1* | 3/2015 | Tanaka | ............... | H04B 10/2575 |
| | | | | 398/115 |
| 2015/0188638 A1* | 7/2015 | Tanaka | ............... | H04B 10/0799 |
| | | | | 398/140 |

* cited by examiner

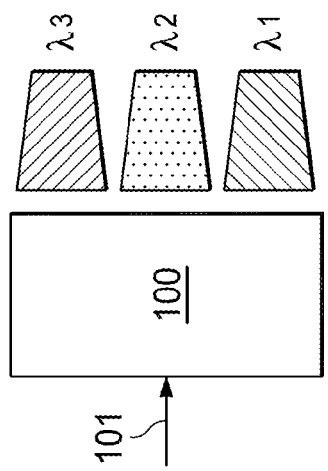
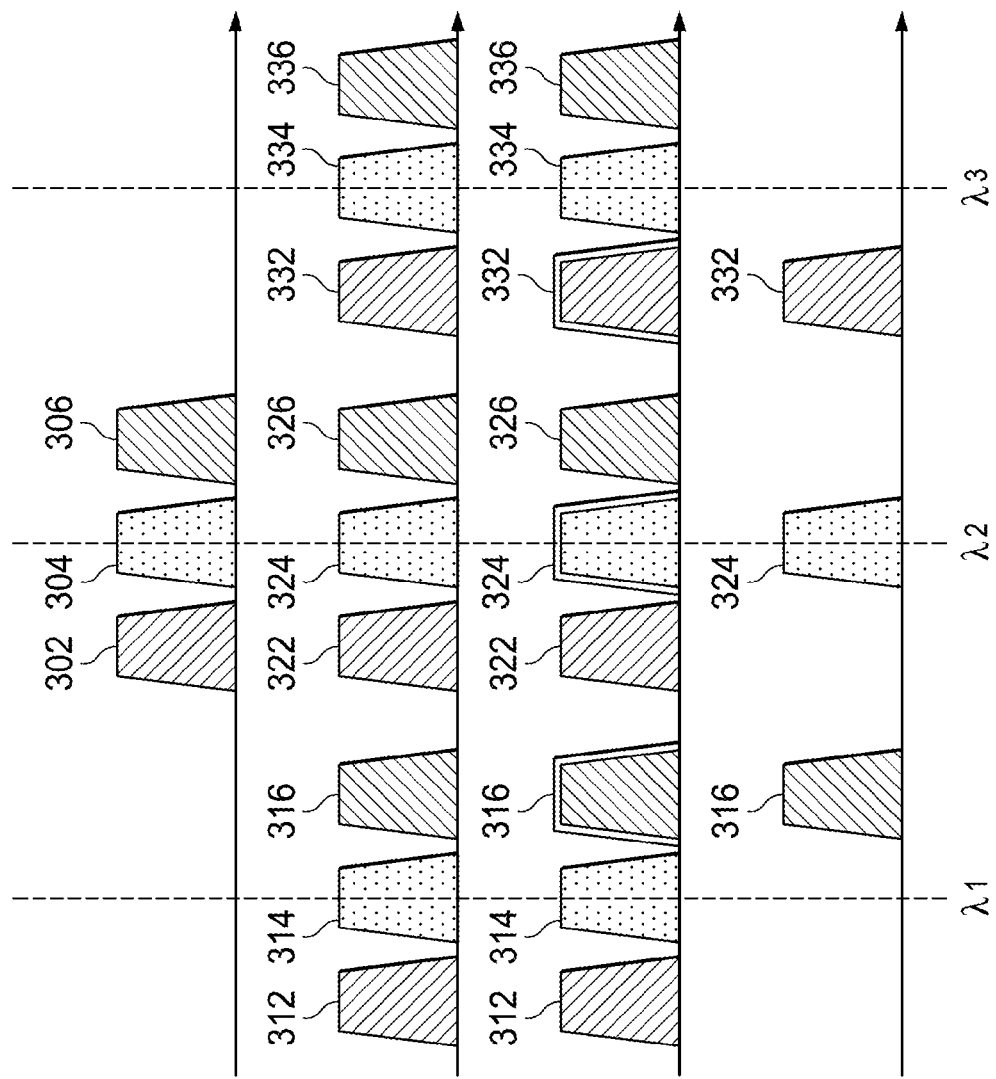

TRANSMITTER APPARATUS AND METHOD

TECHNICAL FIELD

The present invention relates to optical communication devices, and more particularly, to a transmitter apparatus capable of generating multiple wavelength optical signals using a single electro-optic modulator.

BACKGROUND

Optical communication systems are widely used to transmit information through optical fibers between different regions. An optical communication system may comprise a transmitter, a receiver and a fiber coupled between the transmitter and the receiver. A data stream may be sent to the transmitter in electronic form. The transmitter may encode the data stream onto a light carrier. The light carrier travels down the fiber and reaches the receiver. The receiver converts the optical signal into an electrical signal. Furthermore, the receiver is capable of decoding the electrical signal and reconstructing the original data stream.

The process of converting the data stream in electronic form into an optical signal is implemented through various modulation schemes. The modulation schemes comprise the simplest modulation formats such as on-off-keying (OOK). On the other hand, in order to improve spectral efficiency, a variety of modulation formats have emerged. The newly emerged modulation technologies include phase shift keying (PSK), frequency shift keying (FSK), differential quadrature phase shift keying (DQPSK), dual polarization quadrature phase shift keying (DP-QPSK) and/or the like.

As optical communication technologies evolve, various wavelength division multiplexing (WDM) techniques have emerged as an effective alternative to further improve the transmission capacity of optical communication systems. The WDM technique is able to multiplex a variety of optical carrier signals on a single optical fiber. In other words, the data stream is simultaneously transmitted at multiple carrier wavelengths over a single optical fiber. The WDM based optical systems are widely deployed in a variety of applications such as long-haul networks, undersea networks, metro networks and/or the like.

SUMMARY OF THE INVENTION

These and other problems are generally solved or circumvented, and technical advantages are generally achieved, by preferred embodiments of the present invention which provide a system, apparatus and method for improve hardware efficiency of an optical transmitter.

In accordance with an embodiment, an apparatus comprises a digital signal processing module configured to receive a data stream and generate a plurality of digital multiple tones, a plurality of digital-to-analog converters coupled to the digital signal processing module, a plurality of drivers coupled to respective digital-to-analog converters, an electro-optic modulator having inputs coupled to the drivers and outputs coupled to a fiber and a multi-wavelength light source coupled to the electro-optic modulator.

In accordance with another embodiment, a device comprises a processor configured to generate N digital multiple tones, wherein a frequency gap $\Delta fc$ is placed between a center frequency of a tone to a center frequency of an adjacent tone, an electro-optic modulator coupled to an optical source, wherein the electro-optic modulator is configured to receive the N digital multiple tones and copy the N digital multiple tones onto N different wavelengths and an optical filter coupled to the electro-optic modulator, wherein the optical filter is configured such that a single tone is selected at each wavelength division multiplexing channel.

In accordance with yet another embodiment, a method comprises providing a data stream fed to a processor, generating N digital multiple tones based upon the data stream, copying the N digital multiple tones onto N different wavelength division multiplexing channels by an electro-optic element and selecting a tone from the N digital multiple tones at a corresponding wavelength division multiplexing channel.

An advantage of a preferred embodiment of the present invention is a plurality of wavelength division multiplexing (WDM) channels of a transmitter share one single electro-optic modulator. As a result, the cost and power consumption of the transmitter is reduced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates the operation principles of the transmitters shown in FIG. 1 and FIG. 2 in accordance with various embodiments of the present disclosure; and FIG. 4 illustrates an application of the mechanism shown in FIG. 3 in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a coherent transmitter in an optical communication system. The invention may also be applied, however, to a variety of transmitters of optical communication systems. Hereinafter, various embodiments will be explained in detail with reference to the accompanying drawings.

Figure 1:
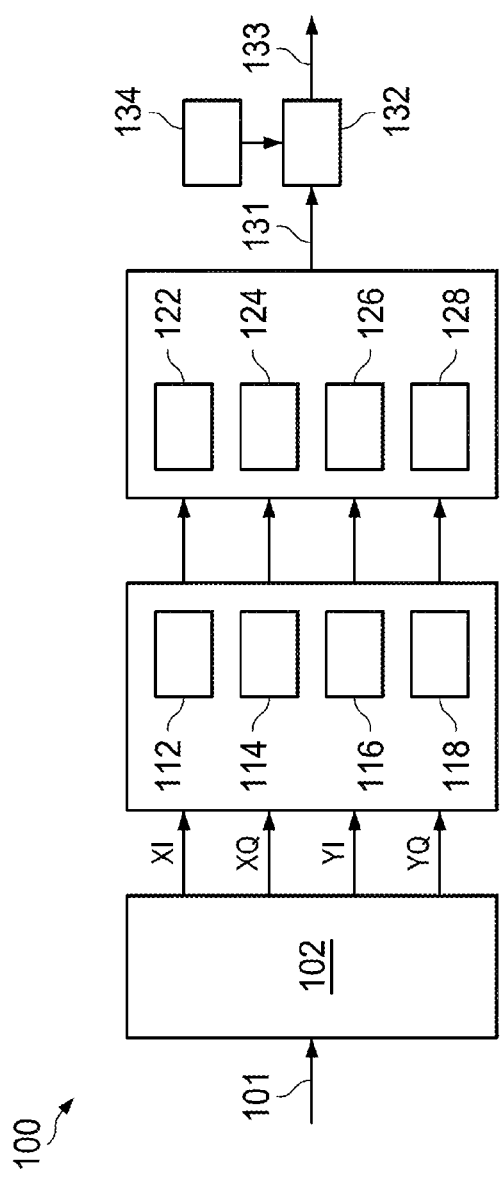
FIG. 1 illustrates a block diagram of a transmitter in accordance with various embodiments of the present disclosure.

FIG. 1 illustrates a block diagram of a transmitter in accordance with various embodiments of the present disclosure. The transmitter 100 comprises a processor 102, a plurality of digital-to-analog converters 112, 114, 116 and 118, a plurality of drivers 122, 124, 126 and 128, an electro-optic element 132 and an optical source 134. As shown in FIG. 1, the processor 102, the digital-to-analog converters 112, 114, 116 and 118, the drivers 122, 124, 126 and 128, and the electro-optic element 132 are connected in cascade between a data stream 101 and an optical signal 133.

In some embodiments, the processor 102 is a digital signal processor. Throughout the description, the processor 102 may be alternatively referred to as the digital signal processor 102. After receiving the data stream 101, the digital signal processor 102 is capable of converting the data stream 101 into a plurality of time-domain digital signals. More particularly, the digital signal processor 102 may comprise a plurality of symbol mappers (not shown). The symbol mappers may map the received data stream onto a variety of modulation formats such as dual polarization quadrature phase shift keying modulation and/or the like.

In some embodiments, the digital signal processor 102 may further comprise other suitable sub-modules such as a pulse shaping module, a chromatic dispersion (CD) pre-compensation module, a state of polarization (SOP) rotation module, a TX pre-compensation module, a non-linear equalizer (NLE) module, a digital multiple tone (DMT) construction module and/or the like.

It should be noted that the DMT construction module may be an integral part of the digital signal processor 102. The DMT construction module may be realized earlier in the data path of the digital signal processor 102. For example, the DMT construction module may be realized after the pulse shaping function occurs in a frequency domain equalization (FDEQ) process. Subsequently, a joint CD pre-compensation process may be performed among various WDM channels.

The dual polarization modulation divides the data stream into two polarizations X and Y. In particular, the X polarization is orthogonal to the Y polarization. In addition, the quadrature phase shift keying modulation varies the phase of the digital signals to further encode the data stream. As a result, the outputs of the digital signal processor 102 include four time-domain digital signals. A first digital signal XI is an in-phase signal at the X polarization direction. A second digital signal XQ is a quadrature signal at the X polarization direction. A third digital signal YI is an in-phase signal at the Y polarization direction. A fourth digital signal YQ is a quadrature signal at the Y polarization direction. In short, the output signals (e.g., XI, XQ, YI and YQ) are used to carry the information of the data stream 101.

It should be noted that while FIG. 1 shows a dual polarization QPSK modulation scheme, the modulation mechanism illustrated herein is limited solely for the purpose of clearly illustrating the inventive aspects of the various embodiments. This diagram herein is merely an example, which should not unduly limit the scope of the claims. One of ordinary skill in the art would recognize many variations, alternatives, and modifications. For example, the modulation scheme may be a single polarization modulation scheme.

As shown in FIG. 1, the first digital signal XI, the second digital signal XQ, the third digital signal YI and the fourth digital signal YQ are sent to their respective digital-to-analog converters 112, 114, 116 and 118. The digital-to-analog converters 112, 114, 116 and 118 are used to convert the digital signals XI, XQ, YI and YQ to their respective analog signals. The drivers 122, 124, 126 and 128 may function as amplifiers through which the analog signals are amplified to analog signals 131 with an appropriate level suitable for the electro-optic element 132 to process these signals.

The analog signals 131 are sent to the electro-optic element 132. As shown in FIG. 1, the electro-optic element 132 receives analog signals 131 as well as optical carriers from the optical source 134. The electro-optic element 132 is employed to encode the analog signals 131 onto the optical carriers to generate an optical signal 133.

In some embodiments, the electro-optic element 132 may be implemented as a quad parallel Mach-Zehnder (QPMZ) modulator. Throughout the description, the electro-optic element 132 may be alternatively referred to as the QPMZ modulator 132.

In some embodiments, the QPMZ modulator 132 may be formed of suitable electro-optic materials such as Lithium Niobate (LN), Lithium Tantalate (LT), Galium Arsenide (GaAs), Indium Phoshite (InP) and/or the like.

As shown in FIG. 1, a pair of signals for in-phase (e.g., XI and YI) and for quadrature (XQ and YQ) may be fed to the QPMZ modulator 132. The QPMZ modulator 132 is capable of synthesizing the received signals optically both in the real and imaginary components, and produces a suitable signal from the received electrical signals. Depending on applications and design needs, the suitable signal may be any form of complex signals such as a QPSK signal, a 16-QAM signal and/or the like.

In some embodiments, the optical source 134 may be a multiple wavelength laser. The optical source 134 may supply a plurality of lights with different wavelengths. Such lights with different wavelengths may function as optical carriers. The QPMZ modulator 132 may encode the analog signals 131 onto the optical carriers so as to generate a plurality of WDM channels. The plurality of WDM channels are converted into an optical signal 133 through a suitable multiplexing process. The optical signal 133 comprises the information of the data stream 101. As such, the data stream 101 is simultaneously transmitted at multiple carrier wavelengths over a single optical fiber. The detailed operation of the QPMZ modulator 132 will be described below with respect to FIG. 3.

The optical source 134 may be implemented as multiple wavelength laser sources such as a single comb laser source and/or the like. In some embodiments, the optical source 134 may produce N lights with different wavelengths. The transmitter 100 shown in FIG. 1 is capable of generating N WDM channels in response to the N lights with different wavelengths. As shown in FIG. 1, the transmitter 100 only includes a single electro-optic set, which includes the digital-to-analog converters (e.g., digital-to-analog converters 112, 114, 116 and 118), the drivers (e.g., drivers 122, 124, 126 and 128), the electro-optic modulator (e.g., the QPMZ modulator 132). In comparison with a conventional transmitter, which requires N electro-optic sets for N WDM channels, the transmitter 100 shown in FIG. 1 reduce the cost and power consumption of an optical communication system.

In addition, since the electro-optic set is shared by a plurality of WDM channels, some function modules related to the electro-optic set in the processor 102 may be shared by the plurality of WDM channels. For example, the NLE module and the TX pre-compensation module may be shared by the plurality of WDM channels.

Furthermore, the transmitter 100 shown in FIG. 1 may be wavelength agile. The transmitter 100 may produce either fixed or flexible grid WDM signals. More particularly, a tunable multiple wavelength laser and an optical filter can work jointly to allocate WDM channels on either fixed or flexible grids. Such WDM signal configuration may help to facilitate wavelength switching and routing.

In sum, one advantageous feature of the transmitter 100 shown in FIG. 1 is that the shared electro-optic set may provide a hardware-efficient solution for generating a plurality of WDM channels. If N WDM channels are generated using the transmitter 100 shown in FIG. 1, the hardware (e.g., electro-optic set described above) of the transmitter 100 may be reduced N-fold.

Figure 2:
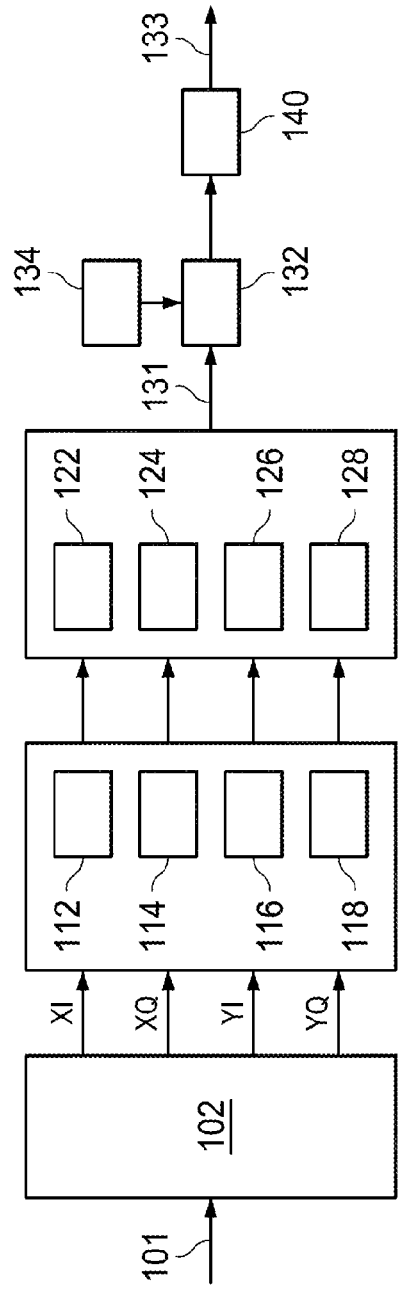
FIG. 2 illustrates a block diagram of another transmitter in accordance with various embodiments of the present disclosure.

FIG. 2 illustrates a block diagram of another transmitter in accordance with various embodiments of the present disclosure. The transmitter 200 shown in FIG. 2 is similar to the transmitter 100 shown in FIG. 1 except that an optical filter 140 is connected to the output of the QPMZ modulator 132. The optical filter 140 is used to select a specific WDM channel from a variety of WDM channels generated by the QPMZ modulator 132. The rest of the structures shown in FIG. 2 is similar to those shown in FIG. 1, and hence is not discussed again herein to avoid repetition.

FIG. 3 illustrates the operation principles of the transmitters shown in FIG. 1 and FIG. 2 in accordance with various embodiments of the present disclosure. The processor 102 (shown in FIG. 1 and FIG. 2) may comprise a DMT construction module (not shown). The DMT construction module may perform a frequency conversion of a complex baseband signal and then add it with the neighbor channels.

In some embodiments, the processor 102 may generate three digital multiple tones, namely a first tone 302, a second tone 304 and a third tone 306. In some embodiments, the tones 302, 304 and 306 may be independent from each other. In other words, the tones (e.g., the first tone 302) may be designed to have different baud rates, modulation formats, pulse shapes and/or the like.

It should be noted that FIG. 3 illustrates only three digital tones generated by the processor 102. The number of digital tones illustrated herein is limited solely for the purpose of clearly illustrating the inventive aspects of the various embodiments. The present invention is not limited to any specific number of digital tones.

As shown in FIG. 3, each tone may be of a center frequency. The frequency gap between the center frequencies of two adjacent tones is defined as $\Delta fc$. It should be noted that the frequency gaps shown in the first row of FIG. 3 are substantially equal. A person skilled in the art will recognize that it is within the scope and spirit of the invention for the digital multiple tones to comprise unequal frequency gaps.

The second row of FIG. 3 shows the output signals at the QPMZ 132 (shown in FIG. 1 and FIG. 2). The optical source 134 may generate lights with three different wavelengths. In particular, the optical source 134 is configured to generate a first wavelength $\lambda 1$, a second wavelength $\lambda 2$ and a third wavelength $\lambda 3$. The lights are sent to the QPMZ 132 in which three tones 302, 304 and 306 are copied onto three different wavelengths $\lambda 1$, $\lambda 2$ and $\lambda 3$ respectively. It should be noted while FIG. 3 shows three different wavelengths $\lambda 1$, $\lambda 2$ and $\lambda 3$ are adjacent to each other, the locations of these three channels used herein are selected purely for demonstration purposes and are not intended to limit the various embodiments of the present invention to any particular wavelength locations.

As shown in FIG. 3, at a first wavelength $\lambda 1$, there may be three optical signals 312, 314 and 316. The optical signals 312, 314 and 316 comprise the information carried by the digital multiple tones 302, 304 and 306 Likewise, at a second wavelength $\lambda 2$, there may be three optical signals 322, 324 and 326. The optical signals 322, 324 and 326 also comprise the information carried by the digital multiple tones 302, 304 and 306. Furthermore, at a third wavelength $\lambda 3$, there may be three optical signals 332, 334 and 336. The optical signals 332, 334 and 336 also comprise the information carried by the digital multiple tones 302, 304 and 306. The dash line at each wavelength indicates the wavelength of the corresponding light generated from the optical source 134.

The third row of FIG. 3 shows the optical filter 140 is used to select a signal from each wavelength. In some embodiments, signals 316, 324 and 332 are selected by the optical filter 140. As a result, there may be three WDM channels at the output of the optical filter 140 as shown in the fourth row of FIG. 3.

In accordance with some embodiments, the equivalent frequency of $\lambda 1$ is defined as f1. Likewise, the equivalent frequency of $\lambda 2$ is defined as f2. The equivalent frequency of $\lambda 3$ is defined as f3.

In some embodiments, the first WDM channel may comprise the signal 316. The signal 316 is of a frequency centered at $(f1+\Delta fc)$. The second WDM channel may comprise the signal 324. The signal 324 is of a frequency centered at f2. The third WDM channel may comprise the signal 332. The signal 332 is of a frequency centered at $(f3-\Delta fc)$.

It should be noted that the diagram shown in FIG. 3 is merely an example, which should not unduly limit the scope of the claims. One of ordinary skill in the art would recognize many variations, alternatives, and modifications. For example, instead of selecting the signal 316, the signal 312 may be selected at the first wavelength channel.

One advantageous feature of the embodiment shown in FIG. 3 is that a plurality of wavelength channels (e.g., three wavelength channels shown in FIG. 3) can share one set of transmitter electro-optic modulator (e.g., the electro-optic element 132 shown in FIG. 1 and FIG. 2). As a result, the implementation cost as well as power consumption of the transmitters shown in FIGS. 1-2 may be reduced.

FIG. 4 illustrates an application of the mechanism shown in FIG. 3 in accordance with various embodiments of the present disclosure. As shown in FIG. 4, a data stream is sent to the transmitter 100. According to the mechanism shown in FIG. 3, the data stream may be mapped onto multiple WDM channels and then routed to different optical paths. In comparison with conventional techniques such as the super-channel Nyquist WDM technique, the transmitter shown in FIG. 4 helps to improve wavelength routing and switching.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a digital signal processing module configured to receive a data stream and generate a plurality of digital multiple tones ranging from a lowest frequency to a highest frequency, wherein the plurality of digital multiple tones form a frequency sequence pattern between the lowest frequency and the highest frequency;
a plurality of digital-to-analog converters coupled to the digital signal processing module;
a plurality of drivers coupled to respective digital-to-analog converters;
an electro-optic modulator having inputs coupled to the drivers and outputs coupled to a fiber, wherein the electro-optic modulator is configured to receive the plurality of digital multiple tones, copy the digital multiple tones onto a plurality of different wavelengths and generate a plurality of corresponding optical signals on each wavelength, and wherein on each wavelength, the plurality of corresponding optical signals keep the same frequency sequence pattern; and
a multi-wavelength light source coupled to the electro-optic modulator, wherein the multi-wavelength light source is configured to generate the plurality of different wavelengths.

2. The apparatus of claim 1, wherein:
the digital signal processing module, the digital-to-analog converters, the drivers and the electro-optic modulator are connected in cascade.

3. The apparatus of claim 1, wherein:
the electro-optic modulator is coupled to an optical source.

4. The apparatus of claim 1, wherein the digital signal processing module is configured to generate:
a first in-phase signal in a first polarization direction at a first output of the digital signal processing module;
a first quadrature signal in the first polarization direction at a second output of the digital signal processing module;
a second in-phase signal in a second polarization direction at a third output of the digital signal processing module; and
a second quadrature signal in the second polarization direction at a fourth output of the digital signal processing module.

5. The apparatus of claim 4, wherein:
the first output of the digital signal processing module is coupled to a first input of the electro-optic modulator through a first digital-to-analog converter and a first driver;
the second output of the digital signal processing module is coupled to a second input of the electro-optic modulator through a second digital-to-analog converter and a second driver;
the third output of the digital signal processing module is coupled to a third input of the electro-optic modulator through a third digital-to-analog converter and a third driver; and
the fourth output of the digital signal processing module is coupled to a fourth input of the electro-optic modulator through a fourth digital-to-analog converter and a fourth driver.

6. The apparatus of claim 1, wherein:
each tone of the digital multiple tones is copied onto a single wavelength division multiplexing channel.

7. A device comprising:
a processor configured to generate N digital multiple tones ranging from a first frequency to a second frequency, wherein:
a frequency gap $\Delta fc$ is placed between a center frequency of a tone to a center frequency of an adjacent tone; and
the N digital multiple tones form a frequency sequence pattern between the first frequency and the second frequency;
an electro-optic modulator coupled to an optical source, wherein the electro-optic modulator is configured to:
receive the N digital multiple tones; and
copy the N digital multiple tones onto N different wavelengths, wherein the electro-optic modulator is configured to generate N corresponding optical signals on each wavelength, and wherein on each wavelength, the N corresponding optical signals keep the same frequency sequence pattern and the N corresponding optical signals are placed in a symmetrical manner with respect to a center optical signal of the N corresponding optical signals; and
an optical filter coupled to the electro-optic modulator, wherein the optical filter is configured such that:
a single tone is selected at each wavelength division multiplexing channel.

8. The device of claim 7, wherein:
the processor is a digital signal processor.

9. The device of claim 7, wherein the processor is configured to generate:
a first in-phase signal in a first polarization direction at a first output of the processor;
a first quadrature signal in the first polarization direction at a second output of the processor;
a second in-phase signal in a second polarization direction at a third output of the processor; and
a second quadrature signal in the second polarization direction at a fourth output of the processor.

10. The device of claim 9, further comprising:
a first digital-to-analog converter coupled to the first output of the processor;
a second digital-to-analog converter coupled to the second output of the processor;
a third digital-to-analog converter coupled to the third output of the processor; and
a fourth digital-to-analog converter coupled to the fourth output of the processor.

11. The device of claim 10, further comprising:
a first driver coupled between the first digital-to-analog converter and a first input of the electro-optic modulator;
a second driver coupled between the second digital-to-analog converter and a second input of the electro-optic modulator;
a third driver coupled between the third digital-to-analog converter and a third input of the electro-optic modulator; and
a fourth driver coupled between the fourth digital-to-analog converter and a fourth input of the electro-optic modulator.

12. The device of claim 11, wherein:
the electro-optic modulator is coupled to a laser source.

13. The device of claim 7, wherein:
the processor is configured to generate a first tone, a second tone and a third tone; and
the optical source is configured to generate a first wavelength $\lambda 1$ with a first frequency f1, a second wavelength $\lambda 2$ with a second frequency f2 and a third wavelength $\lambda 3$ with a third frequency f3.

14. The device of claim 13, wherein:
the electro-optic modulator and the optical filter are configured such that:

the first tone is selected and copied onto a third wavelength channel, wherein a center frequency of the third wavelength channel is equal to (f3−Δfc);

the second tone is selected and copied onto a second wavelength channel, wherein a center frequency of the second wavelength channel is equal to f2; and the third tone is selected and copied onto a first wavelength channel, wherein a center frequency of the first wavelength channel is equal to (f1+Δfc).

15. A method comprising:

providing a data stream fed to a processor;

generating N digital multiple tones based upon the data stream, wherein the N digital multiple tones are in a range from a first frequency to a second frequency and the N digital multiple tones form a frequency sequence pattern between the first frequency and the second frequency;

copying the N digital multiple tones onto N different wavelength division multiplexing channels by an electro-optic element, wherein the electro-optic element is configured to generate N corresponding optical signals on each wavelength division multiplexing channel, and wherein on a first wavelength division multiplexing channel, N optical signals keep the same frequency sequence pattern, and wherein the N optical signals of the first wavelength division multiplexing channel are in a range from a third frequency to a fourth frequency, and wherein one optical signal of the N optical signals of the first wavelength division multiplexing channel is placed at a center frequency of the third frequency and the fourth frequency; and selecting a tone from the N digital multiple tones at a corresponding wavelength division multiplexing channel.

16. The method of claim 15, further comprising:

based upon the data stream, generating a first in-phase signal in a first polarization direction at a first output of the processor;

generating a first quadrature signal in the first polarization direction at a second output of the processor;

generating a second in-phase signal in a second polarization direction at a third output of the processor; and generating a second quadrature signal in the second polarization direction at a fourth output of the processor.

17. The method of claim 15, further comprising:

generating a first tone, a second tone and a third tone, wherein a frequency gap Δfc is placed between two adjacent tones; and copying the first tone, the second tone and the third tone onto three different wavelength division multiplexing channels $\lambda 1$, $\lambda 2$ and $\lambda 3$.

18. The method of claim 17, further comprising:

filtering out the first tone and the second tone at the channel $\lambda 1$;

filtering out the first tone and the third tone at the channel $\lambda 2$; and filtering out the second tone and the third tone at the channel $\lambda 3$.

19. The method of claim 15, wherein:

the electro-optic element is coupled to an optical source.

20. The method of claim 15, wherein:

the processor is a digital signal processor.

* * * * *